April 22, 1958     J. J. PARKER ET AL     2,831,694
EXPANDABLE ARBOR
Filed March 25, 1957     2 Sheets-Sheet 1
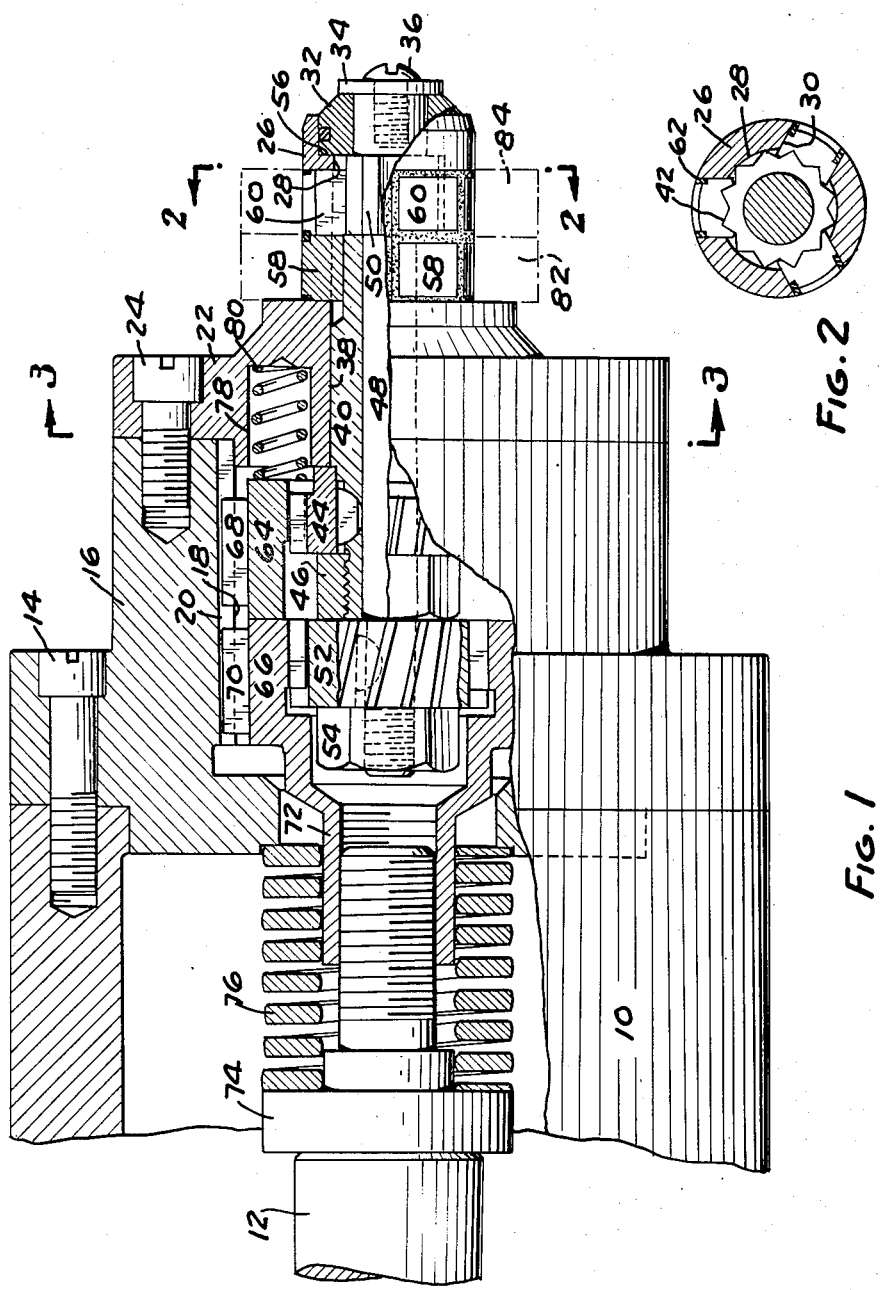
INVENTORS
JOHN J. PARKER & LONDON T. MORAWSKI
BY
ATTORNEYS April 22, 1958

J. J. PARKER ET AL 2,831,694

EXPANDABLE ARBOR

Filed March 25, 1957

INVENTORS
JOHN J. PARKER & LONDON T. MORAWSKI
BY
ATTORNEYS.

2,831,694

EXPANDABLE ARBOR

John J. Parker and London T. Morawski, Detroit, Mich.

Application March 25, 1957, Serial No. 648,303

10 Claims. (Cl. 279—1)

This invention relates to chucks of the expanding arbor type for holding a plurality of similar work pieces having a bore within which the arbor is expandable to engage the work.

Where two or more work pieces are to be held upon a single arbor for economy of production, the fact that no two pieces have exactly the same bore diameter prevents the use of a conventional expanding arbor unless the dimensional tolerance on the parts is held to extremely close limits, which is oftentimes prohibitively expensive.

It is an object of the present invention to provide an expandable arbor which will hold two work pieces simultaneously with a high degree of accuracy as to concentricity of the bore with the machined surface to be produced while the work pieces are thus held.

A further object is to provide in an arbor of the class described an improved actuating mechanism in which a plurality of independently movable sets of jaws may be actuated from a single actuator bar and at the same time may be tightly expanded into contact with each work piece bore, even though there be a wide tolerance in bore diameter from piece to piece.

Further objects and advantages of the present invention will be apparent from the following description, reference being made to the accompanying drawing wherein two embodiments of the present invention are illustrated.

In the drawings:

Fig. 1 is a side view partly in section of an expandable arbor incorporating a preferred form of the present invention.

Fig. 2 is a sectional view taken on line 2—2 of Fig. 1.

Figure 3:
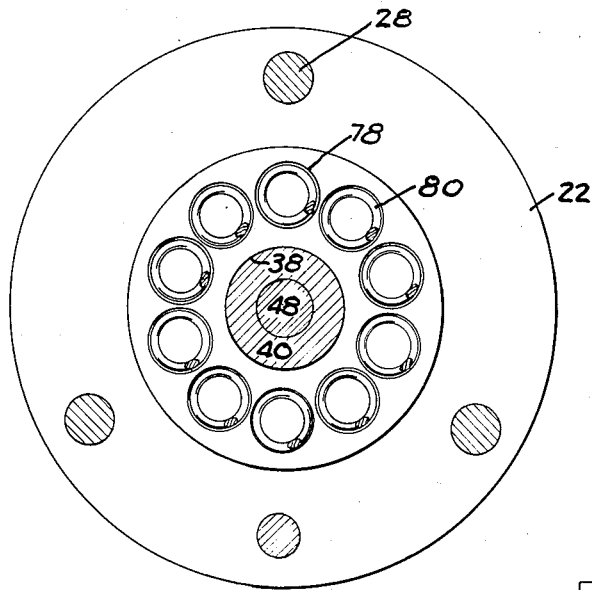
Fig. 3 is a sectional view taken on line 3—3 of Fig. 1.

Referring now to Fig. 1, a support such as a machine tool spindle is illustrated at 10. Shiftable within the hollow interior of the spindle 10 is an actuator rod 12 which may be shifted to the left and right to expand and contract the arbor. Secured to the spindle 10 by cap screws 14 is a main body 16 having an internal bore 18 provided with a keyway 20. Secured to the front end of the main body 16 is an arbor body 22, cap screws 24 being utilized for this purpose.

The construction of the arbor body 22 includes a forwardly extending arbor section 26 having an internal bore 28 and a plurality of equally spaced radial slots 30 (Fig. 2). The arbor section 26 is preferably formed integrally with the body 22 and mounts at its end a spacer ring 32, washer 34 and screw 36.

The body 22 has a bore 38 within which is positioned a hollow shaft 40. Formed on the right hand end of the shaft 40 is a cam section 42 having serrations which take the form of a multi-pointed star. The left hand end of shaft 40 has keyed thereto a helical gear 44 which abuts against the rear face of the body 22 and is secured to the shaft by a nut 46.

Within the hollow shaft 40 there is mounted a solid shaft 48 having a similar star cam 50 at its right hand end, which may be seen in end elevation in Fig. 2. At its left hand end, the shaft 48 has keyed to it a helical gear 52 which abuts against the nut 46 and is secured to shaft 48 by a nut 54. It will be seen that the entire assembly, consisting of the arbor section 26, the body 22, and the shafts 40 and 48, is clamped together by abutment of the spacer 32 against a shoulder 56 on the arbor section 26 at the right hand end; and by abutment of the gear 52 against nut 46 and of gear 44 against the rear face of body 22 at the left hand end.

Figure 5:
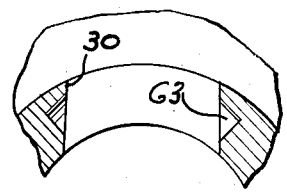
Fig. 5 is a fragmentary view taken on line 5—5 of Fig. 4.

Positioned within the radial slots 30 is a first set of work-engaging jaws 58 and a second set 60. Both sets are arranged for movement radially in and out of the slots and for this purpose their lower ends are shaped with serrations matching the serrations 42 and 50 respectively. Suitable synthetic rubber packings 62 are provided around the outer end of each jaw for the purpose of sealing out dirt and retaining lubricant. These are bonded to the adjacent metal walls so that they serve also as return "springs" for the jaws. Suitable recesses 63 (Fig. 5) may be provided in the walls of slots 30.

Mounted within bore 18 of the main body 16 is a pair of actuating members 64 and 66 which have keys 68 and 70 slideable in the keyway 20. The actuator 66 has a hollow stem 72 to which is threaded the actuator bar 12. The latter is provided with an enlarged flange 74 which serves as an abutment for an actuator return spring 76, the opposite end of which abuts against the inner face of the main body 16. The actuator 66 is provided with an internal helical spline which mates with the teeth of the gear 52.

The actuator 64 is in loose abutment with the right hand end of the actuator 66 and also has an internal helical spline engaging the teeth of gear 44. Mounted within a plurality of bores 78 in the body 22 are a plurality of springs 80 which bias the actuator 64 to the left in Fig. 1.

In operation, the arbor jaws are contracted when the actuator bar 12 is held in its right hand position which is shown in Fig. 1. In this position, springs 76 and 80 are compressed and the splined teeth of the actuators 64 and 66 have rotated the gears 44 and 52 into a position where the star cams 42 and 50 permit the greatest inward retraction of the arbor jaws 58 and 60 under the action of the packings 62. This position is illustrated in Fig. 2. Work pieces 82 and 84 may be slipped over the arbor with their internal bores covering the end faces of the jaws 58 and 60.

The actuator bar 12 may then be permitted to move to the left under the action of springs 76 and 80. The actuators 64 and 66, acting through their helical splines, rotate the gears 44 and 52 and their associated cams 42 and 50 through a small angle. This drives the work engaging jaws 58 and 60 radially outward into engagement with the bores of their respective work pieces.

It will be seen that the amount of travel of each actuator 64 and 66 is independent of the other, since each has its own spring biasing means in the springs 80 and 76 respectively. Thus, the amount through which the jaws 58 are extended may be determined by the size of the bore in the work piece 82, and when the jaws are fully extended, the spring 80 can produce no further travel but serves to hold the jaws tightly in engagement with the work piece. The same thing is true with respect to the jaws 60 and the biasing force of the spring 76. This is true so long as the bore of the part 84 is larger than the bore of the part 82 if the helix angles, cam angles and accumulated lost motions are the same for both sets of jaws and their actuating mechanisms.

However, it is preferred to so construct the parts that it is immaterial whether the larger of the bores is on the inner or the outer set of jaws. This may be done in several ways as by selecting different helix angles of the gears 44 and 52, or different camming angles of the star cams 42 and 50, or by making one set of jaws shorter than the other, all as will be apparent to those skilled in the art.

Figure 6:
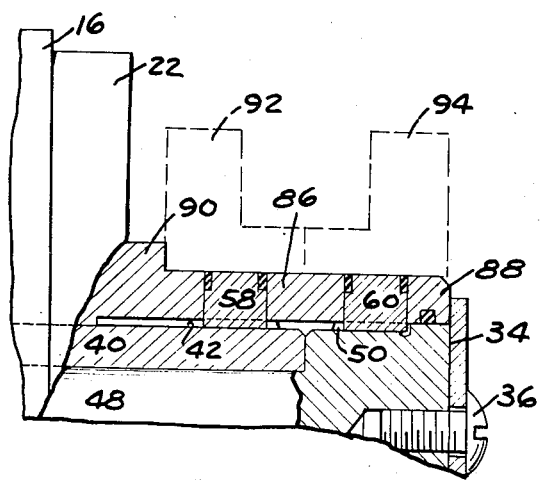
Fig. 6 is a fragmentary view corresponding to Fig. 1 but showing a modified form of the present invention.
Figure 4:
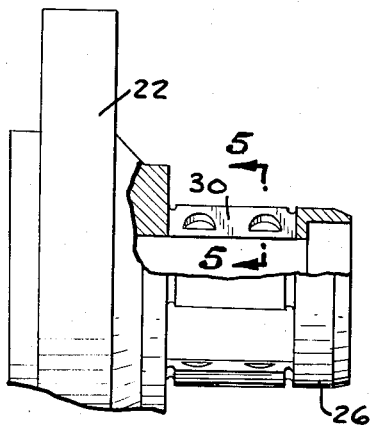
Fig. 4 is a fragmentary view of the main body of the arbor illustrating a portion in section.

Referring now to the modified form shown in Fig. 6, the arbor there illustrated is of similar construction except that an unslotted spacer ring 86 is formed between the two jaw sets 58 and 60. This enables parts of greater axial length such as shown at 92 and 94 to be held in a manner similar to that previously described.

It will thus be seen that the present invention provides an improved expanding arbor in which the mounting of a plurality of similar work pieces is possible so that they may be simultaneously machined. Moreover, this is done without requiring close tolerances upon the bore diameters from piece to piece, while high precision as to concentricity of mounting may be readily obtained.

While the forms of embodiment of the invention herein described constitute the preferred forms, it is to be understood that other forms might be adopted all coming within the scope of the claims which follow.

What is claimed is as follows:

1. An expandable arbor for holding a pair of similar work-pieces having minor differences in the dimension of the bores to be mounted on the arbor comprising a body member having an arbor section at its forward end, means forming a plurality of radial jaw-receiving slots in the arbor section, two indepedent sets of work-engaging jaws mounted in the slots, two independent rotary cams one connected to actuate each set of jaws, a first and a second shuttle member each shiftable in the body and connected to rotate one of the cams, first and second springs for actuating the shuttle members in a direction to expand the jaws, a release bar connected to actuate the first shuttle in a releasing direction, the second shuttle being positioned in the path of travel of the first shuttle to be moved to released position by abutment of the first shuttle thereupon.

2. An expandable arbor for holding a pair of similar work-pieces having minor differences in the dimension of the bores to be mounted on the arbor comprising a body member having an arbor section at its forward end, means forming a plurality of radial jaw-receiving slots in the arbor section, two independent sets of work-engaging jaws mounted in the slots, two independent rotary cams one connected to actuate each set of jaws, a first and a second shuttle member each shiftable in the body and connected by means of a helical and a straight keying means to rotate one of the cams, first and second springs for actuating the shuttle members in a direction to expand the jaws, a release bar connected to actuate the first shuttle in a releasing direction, the second shuttle being positioned in the path of travel of the first shuttle to be moved to released position by abutment of the first shuttle thereupon.

3. An expandable arbor for holding a pair of similar work-pieces having minor differences in the dimension of the bores to be mounted on the arbor comprising a body member having an arbor section at its forward end, means forming a plurality of radial jaw-receiving slots in the arbor section, two independent sets of work-engaging jaws mounted in the slots by means of a rubber-banded joint, two independent rotary cams one connected to actuate each set of jaws, a first and a second shuttle member each shiftable in the body and connected to rotate one of the cams, first and second springs for actuating the shuttle members in a direction to expand the jaws, a release bar connected to actuate the first shuttle in a releasing direction, the second shuttle being positioned in the path of travel of the first shuttle to be moved to released position by abutment of the first shuttle thereupon.

4. An expandable arbor for holding a pair of similar work-pieces having minor differences in the dimension of the bores to be mounted on the arbor comprising a body member having an arbor section at its forward end, means forming a plurality of radial jaw-receiving slots in the arbor section, two independent sets of work-engaging jaws mounted in the slots by means of a rubber-banded joint, two independent rotary cams one connected to actuate each set of jaws, a first and a second shuttle member each shiftable in the body and connected by means of a helical and a straight keying means to rotate one of the cams, first and second springs for actuating the shuttle members in a direction to expand the jaws, a release bar connected to actuate the first shuttle in a releasing direction, the second shuttle being positioned in the path of travel of the first shuttle to be moved to released position by abutment of the first shuttle thereupon.

5. An expandable arbor for holding a pair of similar work-pieces having minor differences in the dimension of the bores to be mounted on the arbor comprising a body member having an arbor section at its forward end, means forming a plurality of radial jaw-receiving slots in the arbor section, two independent sets of work-engaging jaws mounted in the slots, two independent rotary cams one connected to actuate each set of jaws, a first and a second shuttle member each shiftable in the body and connected to rotate one of the cams, first and second springs for actuating the shuttle members in a direction to expand the jaws, a release bar connected to actuate the first shuttle in a releasing direction, the second shuttle being positioned in the path of travel of the first shuttle to be moved to released position by abutment of the first shuttle thereupon, the cams each comprising a multi-pointed star shaped element, as viewed in section and the jaws having mating serrations in contact therewith.

6. An expandable arbor for holding a pair of similar work-pieces having minor differences in the dimension of the bores to be mounted on the arbor comprising a body member having an arbor section at its forward end, means forming a plurality of radial jaw-receiving slots in the arbor section, two independent sets of work-engaging jaws mounted in the slots, two independent rotary cams one connected to actuate each set of jaws, a first and a second shuttle member each shiftable in the body and connected by means of a helical and a straight keying means to rotate one of the cams, first and second springs for actuating the shuttle members in a direction to expand the jaws, a release bar connected to actuate the first shuttle in a releasing direction, the second shuttle being positioned in the path of travel of the first shuttle to be moved to released position by abutment of the first shuttle thereupon, the cams each comprising a multi-pointed star shaped element, as viewed in section and the jaws having mating serrations in contact therewith.

7. An expandable arbor for holding a pair of similar work-pieces having minor differences in the dimension of the bores to be mounted on the arbor comprising a body member having an arbor section at its forward end, means forming a plurality of radial jaw-receiving slots in the arbor section, two independent sets of work-engaging jaws mounted in the slots by means of a rubber-banded joint, two independent rotary cams one connected to actuate each set of jaws, a first and a second shuttle member each shiftable in the body and connected to rotate one of the cams, first and second springs for actuating the shuttle members in a direction to expand the jaws, a release bar connected to actuate the first shuttle in a releasing direction, the second shuttle being positioned in the path of travel of the first shuttle to be moved to released position by abutment of the first shuttle thereupon, the cams each comprising a multi-pointed star shaped element, as viewed in section and the jaws having mating serrations in contact therewith.

8. An expandable arbor for holding a pair of similar work-pieces having minor differences in the dimension of the bores to be mounted on the arbor comprising a body member having an arbor section at its forward end, means forming a plurality of radial jaw-receiving slots in the arbor section, two independent sets of work-engaging jaws mounted in the slots by means of a rubber-banded joint, two independent rotary cams one connected to actuate each set of jaws, a first and a second shuttle member each shiftable in the body and connected by means of a helical and a straight keying means to rotate one of the cams, first and second springs for actuating the shuttle members in a direction to expand the jaws, a release bar connected to actuate the first shuttle in a releasing direction, the second shuttle being positioned in the path of travel of the first shuttle to be moved to released position by abutment of the first shuttle thereupon, the cams each comprising a multi-pointed star shaped element as viewed in section and the jaws having mating serrations in contact therewith.

9. An expandable arbor for holding a pair of similar work-pieces having minor differences in the dimension of the bores to be mounted on the arbor comprising a body member having an arbor section at its forward end, means forming a plurality of radial jaw-receiving slots in the arbor section, two independent sets of work-engaging jaws mounted in the slots, two independent rotary cams one connected to actuate each set of jaws, a solid shaft secured to one cam, a hollow shaft surrounding the first shaft and secured to the other cam, a first and a second shuttle member each shiftable in the body and connected to rotate one of the cams, first and second springs for actuating the shuttle members in a direction to expand the jaws, a release bar connected to actuate the first shuttle in a releasing direction, the second shuttle being positioned in the path of travel of the first shuttle to be moved to released position by abutment of the first shuttle thereupon.

10. An expandable arbor for holding a pair of similar work-pieces having minor differences in the dimension of the bores to be mounted on the arbor comprising a body member having an arbor section at its forward end, means forming a plurality of radial jaw-receiving slots in the arbor section, two independent sets of work-engaging jaws mounted in the slots, two independent rotary cams one connected to actuate each set of jaws, a solid shaft secured to one cam, a hollow shaft surrounding the first shaft and secured to the other cam, a first and a second shuttle member each shiftable in the body and connected by means of a helical and a straight keying means to rotate one of the cams, first and second springs for actuating the shuttle members in a direction to expand the jaws, a release bar connected to actuate the first shuttle in a releasing direction, the second shuttle being positioned in the path of travel of the first shuttle to be moved to released position by abutment of the first shuttle thereupon.

References Cited in the file of this patent

UNITED STATES PATENTS

| | | |
|---|---|---|
| 2,658,764 | Parker | Nov. 10, 1953 |
| 2,681,805 | Parker | June 22, 1954 |